United States Patent

[11] 3,612,086

| | | |
|---|---|---|
| [72] | Inventor | Alfred Roth<br>Talstrasse 30, 8102 Oberengstringen, Switzerland |
| [21] | Appl. No. | 860,855 |
| [22] | Filed | Sept. 22, 1969 |
| [45] | Patented | Oct. 12, 1971 |
| [32] | Priority | Oct. 22, 1968 |
| [33] | | Switzerland |
| [31] | | 15748/68 |

[54] SUPPLEMENTARY DEVICE FOR USE ON A CUTTING TORCH
8 Claims, 2 Drawing Figs.

[52] U.S. Cl. .................................................. 137/87,
266/23, 137/98, 137/114, 137/609
[51] Int. Cl. ........................................................ G05d 16/06
[50] Field of Search ........................................... 137/87, 98,
111, 109, 114; 266/23 PX, 23 R; 187/609, 607,
605, 604; 431/27 HD

[56] References Cited
UNITED STATES PATENTS

| | | | |
|---|---|---|---|
| 3,154,089 | 10/1964 | Anthes ......................... | 137/98 |
| 3,180,396 | 4/1965 | Eichelman..................... | 266/23 |

*Primary Examiner*—Laverne D. Geiger
*Assistant Examiner*—William H. Wright
*Attorney*—William A. Drucker

ABSTRACT: A supplementary device for use on a cutting torch having a fuel gas pipe, a heating oxygen pipe and a cutting oxygen pipe, comprising hand-regulating valves and bypass valves and pneumatic means for closing said bypass valves when cutting oxygen is admitted for changing the fuel gas and heating oxygen quantities from heating conditions to cutting conditions.

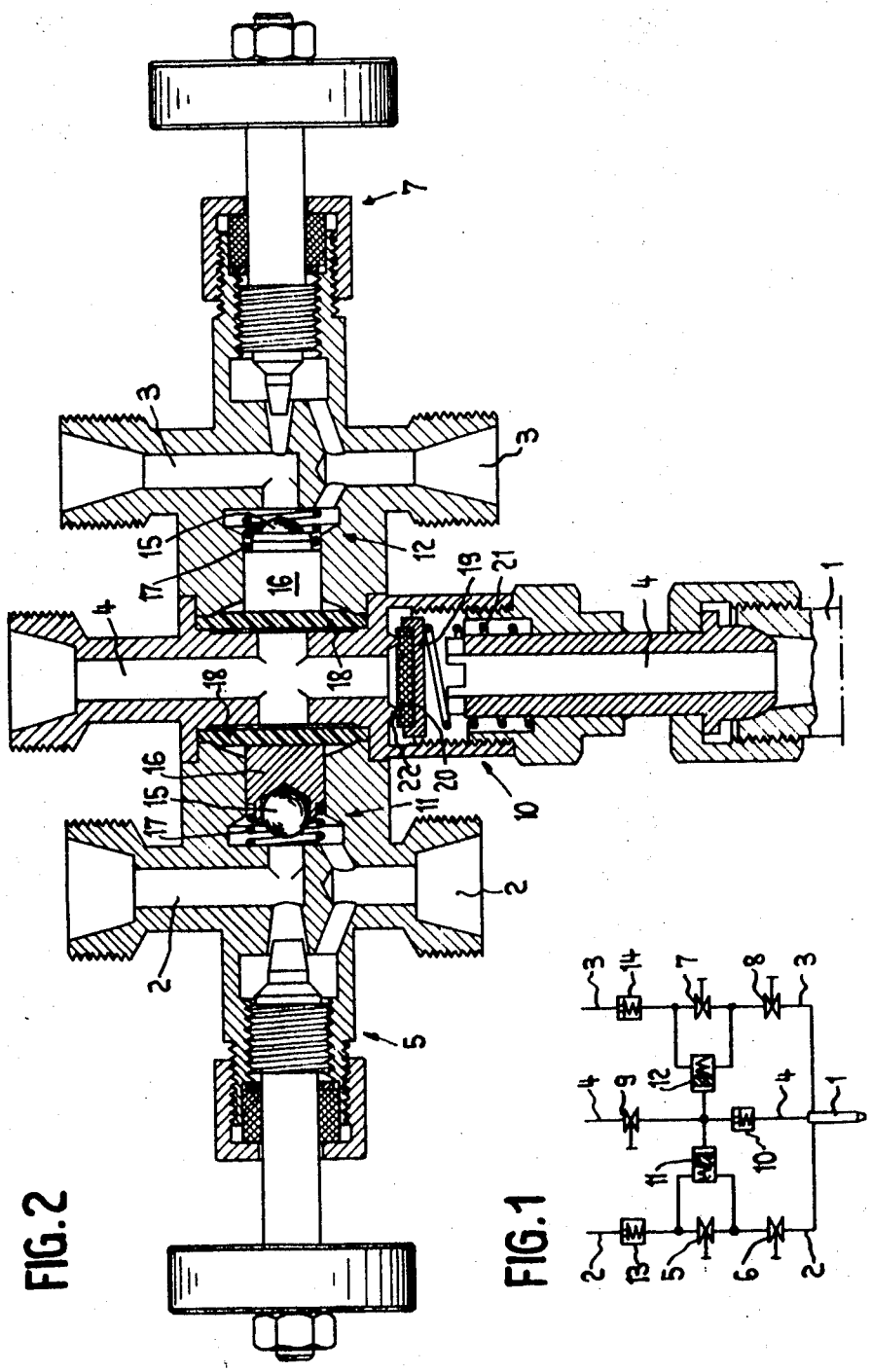

SUPPLEMENTARY DEVICE FOR USE ON A CUTTING TORCH

In oxyacetylene welding with machines, three-hose mechanical cutting torches are used. One hose pipe is intended for the supply of the fuel gas (acetylene, propane etc.) a further pipe for the heating oxygen and the third for the cutting oxygen. The material to be cut is heated to combustion temperature by a heating flame produced at the burner nozzle of the torch, this flame being regulated by valves located on the cutting torch. When this combustion temperature is attained the supply of cutting oxygen is opened and simultaneously the feed movement of the torch is switched on so that the autogenous cutting operation is initiated.

Generally the burner is adjusted to provide a weak heating flame for normal, vertical cuts. Especially when using propane, coal gas and methane as heating gas it is possible only in this way to produce satisfactory, burr-free cut edges, especially on thin sheet. During cutting an excessive heating flame is superfluous and results only in a greater consumption (up to 50 percent higher) of the heating gas mixture. However, when the heating flame is weak, ("soft"), a substantially longer period of time is required to preheat the material than when a powerful heating flame is used. Conventionally used mechanical cutting torches are not equipped to satisfactorily change the regulation of the cutter flame during operation from "heating flame" to "cutting flame." It is usual for the operator to adjust the heating flame very high to avoid wasting time during the heating up process. The disadvantages resultant herefrom have to be accepted.

Devices are known which may be used to counteract this disadvantage. In all cases, however, complete special embodiments are concerned in which all existing valves and other device components are combined in an enclosed unit, this unit in turn may be assembled in a special manner with the torch. A known embodiment (British Pat. specification No. 625,074) has fixedly adjusted flow resistances which determine the inflowing quantities of cutting gas and heating oxygen for the cutting flame. Connected in parallel to these flow resistances are bridging valves which are closed simultaneously with the supply of cutting oxygen. Hence during preheating, that is when no cutting oxygen is supplied, additional quantities of adjustable burning gas or heating oxygen is supplied through these bridging valves, providing a powerful heating flame. When cutting oxygen is supplied the bridging valves are closed automatically, so that during cutting the heating flame is adjusted to be smaller. The changeover of the bridging valves is caused either mechanically from the cutting oxygen valve or, pneumatically by the pressure of the cutting oxygen. In any case, however, continuous regulation of the cutting gas and heating oxygen quantities for both working positions of the torch is not possible. Moreover it is cumbersome and uneconomical, if not impossible, to supplement existing installations by means of the known regulating device.

A further known device which, due to the relatively high purchase price is used only in connection with larger and more costly flame cutting machines, has an arrangement of additional magnetic and pressure reduction valves. These magnetic valves are connected with the electric switching members of the flame cutting machine so that, for example, when one set of magnetic valves are switched off, the other magnetic valves are switched on, and simultaneously the supply of the cutting oxygen is opened and the feed movement is switched on. The transition from a powerful "heating flame" to a weak "cutting heat flame" hence occurs without further addition, but the installation is unsuitable for supplementing existing flame cutters.

It is the object of the present invention to provide a supplementary device which is cheap to produce and simple to operate, and which enables a simple subsequent supplementing of existing three-pipe mechanical flame cutters. In accordance with the present invention there is provided a supplementary device for use on a cutting torch having a fuel gas pipe, a heating oxygen pipe and a cutting oxygen pipe, comprising three hand regulated pipe sections where one is incorporated into the fuel gas pipe, one into the heating oxygen pipe and the other into the cutting oxygen pipe, two hand regulated valves where one is incorporated into the pipe section connected to the fuel gas pipe, and the other is incorporated into the pipe section connected to the heating oxygen pipe, each of these hand regulated valves being connected in parallel to a corresponding control valve, the said control valves being actuated by the pressure of the cutting oxygen, these being closed when the cutting oxygen is flowing into the torch.

In this device the relatively costly electric valves and the whole central control device of the last-mentioned installation have become superfluous, since the changeover from heating flame to cutting flame is effected pneumatically by the supply of the cutting oxygen. The required quantities of fuel gas and heating oxygen may be continuously adjusted independently of each other. Existing parts of existing installations may be fully utilized, such installations being substantially enhanced in a simple and essential manner.

A preferred embodiment of the present invention is now described by reference to the accompanying drawings, in which:

FIG. 1 shows a diagram of the installation of a flame cutter with the supplementary device incorporated, and FIG. 2 shows the supplementary device in section.

The flame cutter 1 is connected to three pipelines, namely a fuel gas pipe 2, a heating oxygen pipe 3 and a cutting oxygen pipe 4. Two hand regulated valves 5 and 6 which are adjustable independently of each other, are connected in series in the fuel gas pipe 2. Likewise two hand regulated valves 7 and 8 independently adjustable are connected in series in the heating oxygen pipe 3. In the cutting oxygen pipe 4 there is a stop valve 9 and a nonreturn valve 10. The two valves 5 and 7 are each bridged by a control valve, 11 and 12 respectively. FIG. 1 shows schematically that the two valves 11 and 12 each have a piston which is held by a compression spring in the position shown when no pressures acting thereon. The space of the valves 11 and 12 on the opposite side of the piston from the spring is connected with the cutting oxygen pipe 4. The control valves 11 and 12 are therefore open when no cutting oxygen is supplied, that is when the stop valve 9 is closed, and are closed by the pressure of the cutting oxygen when it is supplied. The flow resistance of the open valves 11 and 12 is negligibly small compared with the flow resistance of the valves 5, 6, 7 and 8 in any regulating positions. In the feed pipes 2 and 3 nonreturn valves 13 and 14 are located in front of the valves 5 and 7.

The valves 6 and 8 are used to adjust the supply of fuel gas and heating oxygen to the heating flame, that is they are used to adjust the power of the flame. When the workpiece is to be heated, no cutting oxygen is supplied and hence the valves 11 and 12 are open. Thus the fuel gas and heating oxygen supply is regulated exclusively by the valves 6 and 8. When the workpiece is at a suitable temperature, the stop valve 9 is opened and hence cutting oxygen is supplied. The pressure of the inflowing cutting oxygen acts on the pistons of the valve 11 and 12 and displaces these pistons against the spring action, thus closing these valves. Fuel gas and heating oxygen may now be supplied only through valves 5 and 7. These valves are adjusted so that they supply the required fuel gas and heating oxygen for the cutting operation. Thus, since the valves 5 and 7 are adjusted to provide smaller flow quantities than were the valves 6 and 8, the valves 6 and 8 no longer have any substantial influence on the amount of fuel gas and heating oxygen supplied during the cutting operation. However, when the valves 5 and 7 are adjusted prior to operation the flow resistance of the valve 6 and 8 can be taken into account. Hence, the installation is adjusted prior to operation in a set sequence; with valves 11 and 12 open the amounts of fuel gas and heating oxygen required for the heating operations are adjusted by means of the valves 6 and 8, and subsequently with the valves 11 and 12 closed, the amounts of fuel gas and heating oxygen required for the cutting operation are adjusted by means of the valves 5 and 7. The nonreturn valves 10, 13 and 14 prevent any reflux of extraneous gases, for example, if there were leakages in the valves 11 and 12, these nonreturn valves would prevent oxygen flowing into the fuel gas or vice versa. These nonreturn valves make the device safe from the risk of explosion.

Existing flame cutters normally incorporate the regulating valves 6 and 8 and a valve 9 for the cutting oxygen. If necessary, special regulating and stop valves are provided for the cutting oxygen.

The supplementary device according to FIG. 2 is suitable for incorporation into such a known cutting torch. The parts of the hand regulated valves 5 and 7 are not shown in detail and do not require any separate explanation. They are located in the pipe sections 2 or 3. The control valves 11 and 12 herein are formed as ball valves, the balls 15 of which are inserted in cylindrical holders 16. The holders 16 are movable mounted axially in the bore and are retained in the open position shown the springs 17. A diaphragm 18 acts on each holder 16, this diaphragm being displaceably arranged in a chamber which communicates with the cutting oxygen pipe 4. The stop valve 10 is formed as a plate valve and when the oxygen supply is interrupted it prevents a return flow of burning gas through the pipe 4. The valve plate 19 with its seal 20 is urged by the spring 21 against the valve seat 22. If cutting oxygen is supplied through the pipe 4, and then through the valve plate 18, the seal 20 is lifted off the seat 22 and the cutting oxygen may flow to the torch. When the pressure drops in the torch, excess pressure builds up within the diaphragm 18 and acts on the holders 16 and the valve balls 15 against the action of the springs 17 with the result that the valves 11 and 12 are closed. The nonreturn valves 13 and 14, are made in a similar manner to the nonreturn valve 10. In the preferred embodiment, (as shown in FIG. 2) the supplementary device is provided with screw couplings on its three pipe sections so that it can be readily coupled to the three feedpipes 2, 3, and 4. It is readily mounted on any existing torch which, as shown for example in FIG. 2 may be mounted directly on to the fuel pipe 1. For simplicity, the pipe sections of the supplementary device are also denoted by 2, 3, and 4.

One of the devices shown and described may, also be used for regulating the gas supply to several torches.

The passage between the pipe sections 4 and the diaphragm chambers have a smaller cross section than the bores in which the holders 16 are movably mounted. These passages are preferably narrower than shown in FIG. 2, so that they form the actual flow resistances. If the pressure of the cutting oxygen is suddenly increased, these narrow passages dampen the transmission of this pressure so that the diaphragms and valve parts are not forced to carry out any sudden movements which could cause them to deflect prematurely. A further advantage of this embodiment is that when the valve 9 is closed and thus when the pressure of the cutting oxygen in the pipe section 4 of the supplementary device is low, the pressure of the gases in the pipe sections 2 and 3 and the pressure of the spring 17 urges the diaphragms 18 against the edges of the orifices of the said passages, thus providing a reliable seal.

What we claim is:

1. A supplementary device for use on a cutting torch having a fuel gas pipe, a heating oxygen pipe and a cutting oxygen pipe, comprising three hand regulated pipe sections where one is incorporated into the fuel gas pipe, one into the heating oxygen pipe and the third into the cutting oxygen pipe, two hand regulated valves where one is incorporated into the pipe section connected to the fuel gas pipe and the other is incorporated into the pipe section connected to the heating oxygen pipe, each of these hand regulated valves being connected in parallel to a corresponding control valve, an actuating diaphragm in each of said control valves, said cutting oxygen pipe being disposed between said heating oxygen pipe and fuel gas pipe with connection ducts from said cutting oxygen pipe to one side of each of said diaphragms, said cutting oxygen pipe being adapted for insertion downstream a cutting oxygen inlet valve, said diaphragms and the said control valves being actuated by the pressure of the cutting oxygen, these being closed when the cutting oxygen is flowing into the torch.

2. A device as claimed in claim 1, wherein each of the pipe sections terminate in two connecting sockets with coupling threads.

3. A supplementary device for use on a cutting torch having a fuel gas pipe, a heating oxygen pipe and a cutting oxygen pipe, comprising three hand regulated pipe sections where one is incorporated into the fuel gas pipe, one into the heating oxygen pipe and the other into the cutting oxygen pipe, two hand regulated valves where one is incorporated into the pipe section connected to the fuel gas pipe and the other is incorporated into the pipe section connected to the heating oxygen pipe, each of these hand regulated valves being connected in parallel to a corresponding control valve, the said control valves being actuated by the pressure of the cutting oxygen acting on diaphragms, these being closed when the cutting oxygen is flowing into the torch, passages between the pipe section for the cutting oxygen and the diaphragms are formed as narrow flow resistances such that a sudden actuation of the diaphragms and the control valves actuated thereby, is prevented when applying the cutting oxygen pressure and the control valves being formed as ball valves, the balls of which are mounted in cylindrical holders guided in bores where each of these holders is connected to the corresponding diaphragm, when the cutting oxygen pressure is reduced, the holders and the valve balls are retained in the open state by the spring action of a return spring and by the action of the associated diagram.

4. A device as claimed in claim 3 wherein the passages between the pipe section for the cutting oxygen and the diaphragm have a smaller cross section than the holders, such that when the cutting oxygen pressure is reduced the diaphragms are subject to the said spring action and are pressed against the orifices of the passages.

5. A device as claimed in claim 1 wherein a nonreturn valve is arranged in the cutting oxygen feed pipe between the point at which the cutting oxygen acts on the control valves and the torch (1).

6. A device as claimed in claim 1, wherein nonreturn valves are provided, one being arranged in front of the control valve in the feed pipe for the fuel gas and the other being arranged in front of the control valve in the feed pipe for the heating oxygen.

7. A supplementary device for use on a cutting torch having a fuel gas pipe, a heating oxygen pipe and a cutting oxygen pipe, comprising three hand regulated pipe sections where one is incorporated into the fuel gas pipe, one into the heating oxygen pipe and the other into the cutting oxygen pipe, two hand regulated valves where one is incorporated into the pipe section connected to the fuel gas pipe and the other is incorporated into the pipe section connected to the heating oxygen pipe, each of these hand regulated valves being connected in parallel to a corresponding control valve, the said control valves being actuated by the pressure of the cutting oxygen, these being closed when the cutting oxygen is flowing into the torch, a nonreturn valve being arranged in the cutting oxygen feed pipe between the point at which the cutting oxygen acts on the control valves and the torch.

8. A supplementary device for use on a cutting torch having a fuel gas pipe, a heating oxygen pipe and a cutting oxygen pipe, comprising three hand regulated pipe sections where one is incorporated into the fuel gas pipe, one into the heating oxygen pipe and the other into the cutting oxygen pipe, two hand regulated valves where one is incorporated into the pipe section connected to the fuel gas pipe and the other is incorporated into the pipe section connected to the heating oxygen pipe, each of these hand regulated valves being connected in parallel to a corresponding control valve, the said control valves being actuated by the pressure of the cutting oxygen, acting on two diaphragms operating each one of said control valves, these being closed when the cutting oxygen is flowing into the torch, passages between the pipe section for the cutting oxygen and the diaphragms being formed as narrow flow resistances such that a sudden actuation of the diaphragms and the control valves actuated thereby, is prevented when applying the cutting oxygen pressure.